April 26, 1966  T. J. SCARNATO ETAL  3,247,657
ROTARY MOWER BLADE STRUCTURE
Original Filed July 24, 1962

INVENTORS.
Thomas J. Scarnato
Roman J. Kasper
Richard E. Phillips
Paul O. Pippel Atty.

United States Patent Office 3,247,657
Patented Apr. 26, 1966

3,247,657
ROTARY MOWER BLADE STRUCTURE
Thomas J. Scarnato, Park Ridge, and Roman J. Kasper, Downers Grove, Ill., and Richard E. Phillips, Storrs, Conn., assignors to International Harvester Company, Chicago, Ill., a corporation of New Jersey
Continuation of application Ser. No. 211,985, July 24, 1962. This application Feb. 11, 1965, Ser. No. 438,158
1 Claim. (Cl. 56—295)

This invention relates to mower and more particularly to rotary mowers and is a continuation of our co-pending application Serial No. 211,985, filed July 24, 1962, for Rotary Mower Blade Structure, now abandoned.

In the art of cutting vegetation various attempts have been made to provide a mowing apparatus which would obtain maximum efficiency with minimum cost. It appears that in all considerations the rotary mower in general meets these classifications. The simplest arrangement comprises utilizing a rotary blade which operates on a substantially vertical axis. The integral blade, of course, possesses a serious inherent disadvantage in that upon striking an obstruction it may and frequently does hazard the other driving mechanism and impacts may be of such severity as to actually cause serious damage. The alternative has been to provide a knife carrier which is secured to the vertical rotating shaft and then to pivot the knives about the ends or periphery of the carrier in such manner that the knives are caused to swing back or break back upon striking the obstruction. Although in general the need for mounting the knives pivotally on the carrier has been recognized and appreciated we have discovered that no attention has been paid to the knife construction per se such that it not only lays back upon striking an obstruction but under load performs economically and efficiently. We have discovered that the efficiency of the knife and thus the power consumption is recti-related to the position of the knife edge as it severs the material. We have determined that the optimum position is to have the blade or the edge strike the material normal to the resistance. We have also determined that when the knife blade lays back that the power consumption is materially increased and that the material is cut poorly leaving a ragged edge and that the efficiency of the unit in general is greatly reduced.

A general object of the invention is to provide a novel knife structure and mounting therefor such as will obtain optimum cutting characteristics of the knife when it is under load.

A further object of the invention is to provide a novel, simple and inexpensive knife which will meet the foregoing objectives.

A still further object of the invention is to provide a novel knife comprising a substantially sheet steel member having a novel shape which is simple to manufacture and which upon being mounted on a carrier will function to position the edge of the knife at optimum cutting efficiency. More specifically the invention contemplates in the two embodiments herein shown a novel knife structure which for lighter cutting or cutting of lighter material is substantially half of a trapezoid and for having heavier cutting material is substantially a full trapezoid.

The invention contemplates a novel arrangement of the mass of the knife material such that in the free swinging position under no load the knife will extend with its cutting edge inclined into the direction or leading into the direction of cut and under load will move back under normal circumstances only a sufficient amount to present the edge generally radially with respect to the axis of rotation of the knife assembly.

These and other objects and advantages inherent in and encompassed by the invention will become more readily apparent from the specification and the drawings wherein.

Figure 1:
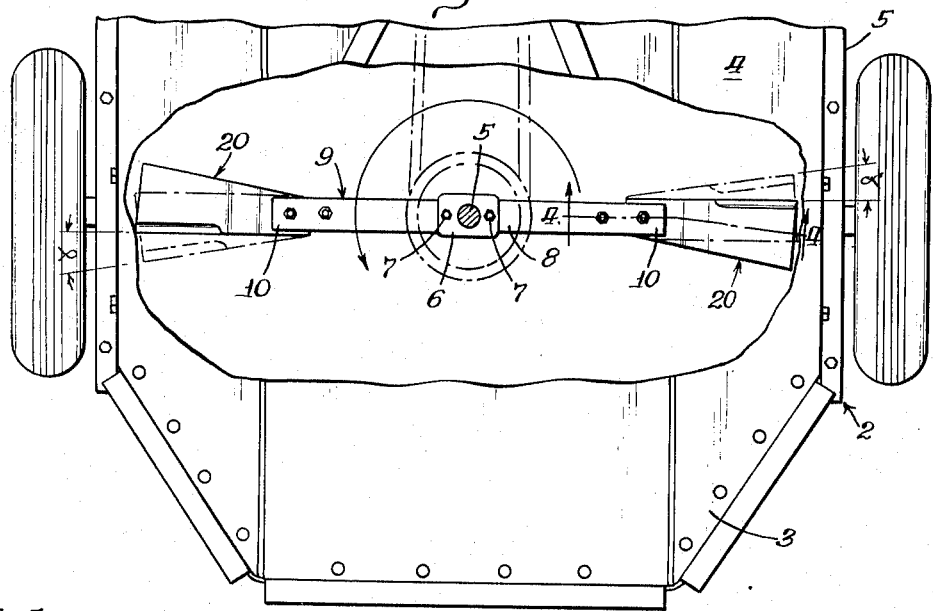
FIGURE 1 is a fragmentary plan view of a novel rotary mower with portions of the housing rocking away with portions of the cutter shown in section.
Figure 2:
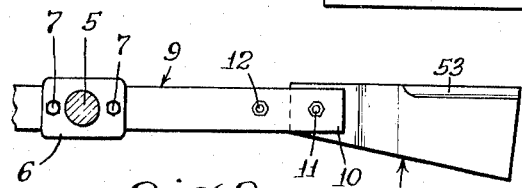
FIGURE 2 is a fragmentary and enlarged view of one end of the knife structure.
Figure 3:
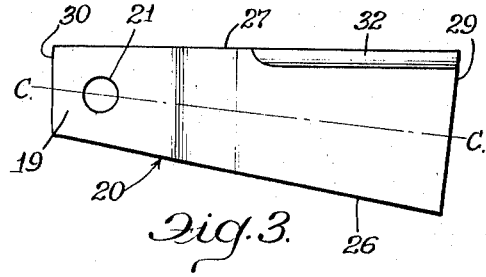
FIGURE 3 is an enlarged plan view of the knife.
Figure 4:
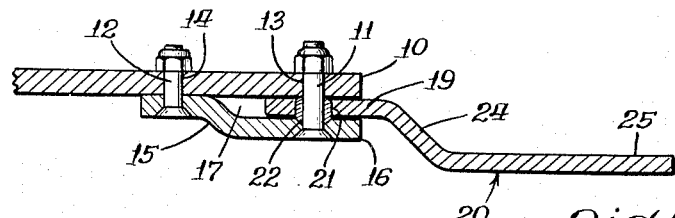
FIGURE 4 is a sectional view taken substantially on the line 4—4 of FIGURE 1.

Describing the invention in detail and having particular reference to the drawings, in the embodiments of FIGURES 1 through 4 there is shown a mower generally designated 2 which comprises a conventional housing 3 having top wall 4 and peripheral walls 5 which are dependent from wall 4. The wall 4 mounts thereon a substantially vertical rotating spindle bar in any conventional manner as well known to those skilled in the art, the spindle being directly driven from the crankshaft of power unit or through the medium of belts and the like. The shaft 5 extends into the housing enclosure substantially medially thereof and at its lower end is connected to a mounting block or pad 6 which is provided with a pair of fastening bolts 7—7 which suitably secure the medial portion 8 of the knife carrier or arm generally designated 9. The carrier 9 extends substantially horizontally and may be either straight or may have any other suitable configuration as well known to those skilled in the art. The outer end portions 10 of the knife mounting admits a pair of bolts 11 and 12 through apertures 13 and 14, these bolts secure the underlined clamp or jaw 15 thereto. The clamp 15 has a downwardly offset outer end portion 16 with which the end portion 10 develop a space 17 therebetween into which is admitted the inner end portion 19 of the knife or blade generally designated 20. The inner end portion of the blade is apertured as at 21 and admits a bearing or spacer 22 therethrough about which the knife 20 pivots. It will be seen that the inner end portion 19 of the knife 20 merges into a downwardly and outwardly inclined intermediate portion 24 which in turn merges into the substantially horizontal knife outer end portion 25. The trailing edge 26 of the blade is diagonally disposed with respect to the leading edge 27 whereby the knife widens out from the inner end 19 to the outer extremity 29. The leading edge 27, however, is substantially but not quite normal to the inner edge 30 and to the outer edge 29. In effect, the shape of the blade is somewhat half the trapezoid. The inner end portion 19 of the knife 20 is provided substantially immediately thereof, that is, between the leading and trailing edges with the beforementioned aperture 21 and the leading edge of the outer end portion 25 is sharpened with a downward forward bevel along its full length as shown at 32. The center of gravity of the knife is substantially along the line C—C of FIGURE 3 and thus it will be seen that in rotation of the knife assembly which includes the holder or carrier 9 and the knife blades 20 that the blades 20 will have their cutting edges 32 extending or inclined forwardly by the angle α. Upon the knife blade meeting the resistance of the material, it will be understood that various knives adapted to be used with different materials to be cut and the same so far as the weight of the knife and various dimensions thereof will depend upon the speed of rotation of the knife assembly as well as the mass of the knife assembly as well as the material to be cut. The optimum condition is to so arrange these various factors so that the cutting edge of the knife will be presented substantially normal to the load upon cutting and in the present disclosure in this application such optimum condition is herein described as so disposing the knife blade that its edge or said cutting edge is disposed generally parallel to the radius or diameter of the cutting assembly.

Figure 5:
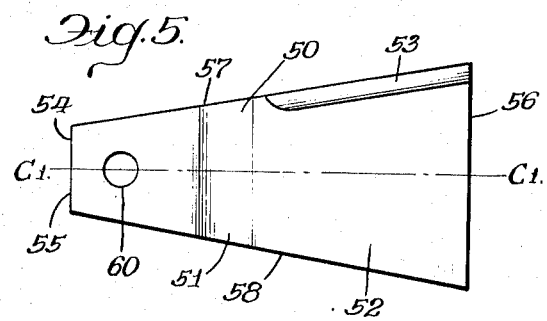
FIGURE 5 is a plan view of a modified form of the knife.

Referring now to FIGURE 5 it will be understood that the blade 50 therein shown is substantially in the form of a trapezoid in plan view and is also flat-plate as are the other knives herein described and has an inner end portion 54 which is offset similarly to the inner end of the other knife and intermediate portion 51 and outer end portion 52. The outer end portion is sharpened along its leading edge as at 53 similarly to the sharpening at 32 of the previous knife. In the present instance, the inner edge 55 and the outer edge 56 are substantially parallel and the leading edge 57 and trailing edge 58 converge in direction toward the base or the inner end 55 and diverge with respect to the outer edge 56. In this construction which is for heavy duty application the center of gravity identified as C1—C1 passes through the mounting opening 60 which is adapted to be mounted about the sleeve 22. The opening 60 is located substantially medially between the front and rear edges 57, 58 and center with respect to the inner end portion 19. It will be observed that in all of these embodiments, the knife blade could be essentially flat, without affecting its performance. In the present embodiment of FIGURE 5 it will be observed that the knife blade will normally have its leading edge 53 disposed at an acute angle by the angle $\alpha$ to the diameter of the cutting assembly when the mechanism is rotating freely and upon the application of a load, that is the material being cut, the leading edge will swing back and will locate in optimum position which is substantially parallel to the diameter of the cutting assembly.

Thus in each of the embodiments a novel form of knife and mounting therefor has been disclosed which has been adequately proven in field demonstrations and applications and has been found to perform efficiently. A simple construction has been provided upon discovery of the phenomenon heretofore described.

Having described several preferred embodiments of the invention it will be appreciated that various other forms of the invention will become readily apparent to those skilled in the art within the scope of the appended claim.

What is claimed is:

In a rotary mower, a support, a vertical drive spindle journaled on the support, an elongated carrier constrained for rotation with the spindle, and blades at opposite ends of the carrier, each blade being substantially trapezoidal having inner and outer edges and straight leading and trailing edges, said blade having a pivot opening adjacent to said inner edge on the longitudinal center line of gravity of the blade between said leading and trailing edges, said blade being symmetrical both as to thickness and other dimensions so that its mass is symmetrically distributed on each side of said center line of gravity, said blade having a sharpened cutting edge portion on said leading edge extending inwardly from said outer edge, said outer edge defining the maximum width of the blade and said blade gradually tapering in width from said outer edge to said inner edge, and said blade having its maximum width along said outer edge in alignment with the apex of said cutting edge portion in the cutting direction of movement of said blade whereby upon cutting material said blade in rotating presents the maximum cutting force at said apex with the force diminishing radially inwardly from said outer edge, said outer edge being straight, said blade having unbroken substantially flat and substantially parallel top and bottom sides from the leading to the trailing edges and presenting unobstructing surfaces to cut material moving therealong and to the flow of air, said outer edge being disposed substantially normal to said center line of gravity of the blade.

References Cited by the Examiner
UNITED STATES PATENTS

| | | | |
|---|---|---|---|
| 2,651,159 | 9/1953 | Rountree | 56—25.4 |
| 2,815,631 | 12/1957 | Northcote et al. | 56—295 |
| 2,916,867 | 12/1959 | Chadwick | 56—295 |
| 2,924,058 | 2/1960 | Brooks | 56—295 |

ABRAHAM G. STONE, *Primary Examiner.*
RUSSELL R. KINSEY, *Examiner.*